United States Patent
Musacchia, Jr.

(10) Patent No.: US 6,780,079 B2
(45) Date of Patent: Aug. 24, 2004

(54) ELEVATED GAME CALL WITH ATTACHMENT FEATURE

(75) Inventor: John Musacchia, Jr., Cartersville, GA (US)

(73) Assignee: Muzzy Products Corporation, Cartersville, GA (US)

( * ) Notice: Subject to any disclaimer, the term of this patent is extended or adjusted under 35 U.S.C. 154(b) by 241 days.

(21) Appl. No.: 09/174,868

(22) Filed: Oct. 19, 1998

(65) Prior Publication Data

US 2001/0018311 A1 Aug. 30, 2001

(51) Int. Cl.[7] .................................................. A63H 5/00
(52) U.S. Cl. ..................... 446/397; 446/404; 446/26; 446/418; 224/267; 224/910; 224/222
(58) Field of Search ................................ 224/101, 191, 224/218, 219, 222, 224, 225, 250, 251, 267, 277, 910; 108/43; 446/26, 28, 397, 404, 418; 84/411 R, 420, 421, 102, 402, 327–329, 280, 453

(56) References Cited

U.S. PATENT DOCUMENTS

| | | | |
|---|---|---|---|
| 4,387,531 A | * | 6/1983 | Jacob ........................ 446/397 |
| 4,606,733 A | | 8/1986 | Willis |
| 4,955,845 A | | 9/1990 | Piper |
| 5,035,390 A | | 7/1991 | Sanders |
| 5,111,981 A | | 5/1992 | Allen |
| 5,178,575 A | | 1/1993 | Koch |
| 5,244,430 A | | 9/1993 | Legursky |
| 5,607,091 A | | 3/1997 | Musacchia |
| 5,648,753 A | * | 7/1997 | Martin ........................ 446/404 |
| 5,716,254 A | * | 2/1998 | Bowes ........................ 446/397 |

* cited by examiner

Primary Examiner—Derris H. Banks
Assistant Examiner—Urszula M Cegielnik
(74) Attorney, Agent, or Firm—Gerald E. Helget; Briggs and Morgan, P.A.

(57) ABSTRACT

A unitary game call having a platform with legs, that can be affixed to a limb of a hunter. When retained, the game call's bottom face, or sound emanating surface, is maintained in a position elevated from the hunter's limb by the legs depending from the platform. Further, an adjustable, flexible body attaching member serves to secure the retained game call relative the limb.

17 Claims, 7 Drawing Sheets

ELEVATED GAME CALL WITH ATTACHMENT FEATURE

BACKGROUND OF THE INVENTION

1. Field of the Invention

The present invention relates generally to a hunting device for calling game. Particularly, the present invention relates to an improved game call device of unitary construction having a game call portion and a platform portion. The game call portion is that portion of the present invention that produces the calling sounds. Further, the present game call can be retained securely relative to a hunter's body, and is elevated from the hunter's body by the platform portion. Thus, the hunter has instant, ready access to the present call when secured to the body while the field performance of the present invention, having percussive or friction-generated type game call portions, is not compromised.

2. Description of the Prior Art

Game call devices are used by hunters and intended to attract a particular specie of animal toward the hunter by producing certain selected sounds to imitate the mating calls or other sounds made by the animal or fowl of interest to the hunter. Presumably, while using a call, an animal will near such a production of sound, which in this case is the hunter using the game call. While the present invention provides a novel game call designed to attract numerous types of animals, the present device will be detailed and described generally as a turkey call.

Conventional percussive or friction-generated types of game calls (slate and box calls, either pin or rocker) are perhaps the most common types of hand-actuated turkey calls. Although quite effective when in the hands of an experienced hunter, by their very nature the two-handed use of these devices frequently results in lost kill opportunities for the hunter. Ideally when seeking a hunting spot, the turkey hunter selects an appropriate location to establish a comfortably stand, such as seated, while the hunter rests his/her back against a tree. Typically, the hunter must devote the use of both hands to operate the conventional call, and, therefore, there is no free hand on the hunter's weapon. The hunter must prop or cradle the weapon, while using both hands to hold and manipulate the conventional call. When a turkey is called and approaches to a point within the hunter's striking range, the hunter first must drop or put down the call device, and second bring the weapon, typically a shotgun or the like, up for the shot.

Turkeys by their nature are particularly elusive. The eyesight of a turkey is so acute, and its reaction time so quick, that upon detecting the slightest foreign sound or motion, the bird reacts by fleeing. Thus, just the body motions alone associated with discarding the conventional call and reaching for the weapon, even without making a sound, are more than enough to frighten the turkey out of range before a shot can be fired.

Mouth call devices can similarly generate enough body motion or noise to scare away a sighted (in range) turkey as the hunter must either spit the call out or use a hand to remove the call from the mouth before bringing up the shotgun for any firing opportunity.

Hunting game in the best of conditions is difficult enough without the added motion and noise associated with convention calls. Generally, in view of the shot load and the relatively dense surrounding cover, it will be appreciated that a rather limited range of fire is available to the hunter. Accordingly, for the successful hunter, a practically instantaneous response time is required between the annual's entrance into the range of fire and the time the shots are fired, and such response must be conducted with the absolute minimum of noise and motion. Therefore, it is highly desirable for the hunter to use a device that permits the secure attachment of the game call to the hunter's body, which attachment accommodates the one-handed operation of the call. In this configuration, the hunter can maintain the weapon at the ready position with the second, free hand, while concurrently operating the present invention. Further, there is no need to place aside or discard the call the of present invention when the animal is within range as the call remains attached to the hunter's body.

One type of conventional game call has a circular configuration found in several slate type calls. A typical example of such a device may be found in the Ultimate Model Game Call as manufactured by Knight & Hale Game Calls, Inc. Such calls include a housing having a circular peripheral that may be tapered or stepped inwardly towards the sound emanating surface of the call. Other type friction calls, such as box calls, have a highly frictional surface that, when rubbed by a striker, result in sounds.

For these types of calls, the sounds are amplified or concentrated within the game call's housing, and typically emanate from a plurality of holes formed in the sound emanating surface of the game call. If the game call had no venting, or holes, the sound in the housing would be stifled from reaching the ambient air. Thus, present game calls are not suitably constructed to attach to a hunter's body limb because there would be contact between the bottom of the game call and the body limb, and therefore the call would not generate the proper sound because the holes in the sound emanating surface of the call would be blocked by the surface of the limb.

In U.S. Pat. No. 5,607,091 to Musacchia, is described a universal game call holder, which holder device comprised a platform to be used in conjunction with a separately purchased prior art call, wherein the call is retained in the platform by a retaining element. With the '091 holder, the conventional call slips within an aperture in the platform, which platform elevates the bottom of the call away from the user's limb.

The Musacchia device discloses and claims only a game call platform having, among other things, a retaining element to maintain the hunter's call in contact with the platform. The present invention obviates the need for: 1) a separate platform; 2) a retaining element to secure the call to the holder; and 3) a separate call. The present call is a unitary call device, eliminating any construction by the user, and having no retaining element to use, repair or replace.

Similarly, a holder for a game call is disclosed in U.S. Pat. No. 5,244,430 to Legursky which patent illustrates a carrier device for the transport of a caller. A specifically configured support is constructed to cooperate with a mating configuration on the bottom of a turkey caller to receive the call.

Although adjustable straps are shown for attaching the carrier to a user's limb, it is apparent that the carrier support flushly engages the caller box bottom which is contrary to the present construction wherein the game call is of unitary construction allowing for a spaced apart relationship between the call and the limb of the user.

One type of slate box turkey call is disclosed in U.S. Pat. No. 4,606,733 to Willis, wherein a sound box has a reciprocating striker rod that frictionally engages a planar striker plate juxtaposed to a sound chamber. Such interaction between a striker member and a slate type element is representative of many slate box types of turkey calls relying upon a frictional or percussive effect to replicate a game call.

U.S. Pat. No. 4,955,845 to Piper depicts another form of slate box game caller. Although mentioning a one-handed operation, Piper alludes to the interconnection of a multitude of sound producing components. The specification also refers to holding a support structure in a user's hand. Such manipulation of a box call device is common since maximum success is achieved in reproducing a game call when there is minimum impedance to propagation of the sound vibrations emanating from the sound box or chamber. Piper also illustrates a holder for the device in the form of a belt carried pouch which holder only is for transport purposes. Thus, Piper may not be considered the equivalent of the present call device, wherein the device is secured to and spaced from the user's body so that the sound vibrations are allowed to issue from beneath the present invention.

A typical frictional or percussive type game call is disclosed in U.S. Pat. No. 5,178,575 to Koch, which describes a sound box fitted with a striker plate that cooperates with a striker element to produce a desired sound. Both the body attachment means and platform portion of the present device is missing from Koch.

It is known to provide an adapter for attaching a call device to a firearm as shown in U.S. Pat. No. 5,035,390 to Sanders, which suggests an apparatus for facilitating the use of an animal call while keeping one's firearm at the ready. Unlike the present invention which is preferably secured to a hunter's thigh, the Sanders' device is affixed to a firearm which presents an unbalanced mass on the weapon, thus limiting the sizes and types of call devices that could be attached thereto.

A further example of a hands-free type of game call holder is disclosed in U.S. Pat. No. 5,111,981 to Allen, wherein a mouth game call apparatus is supported on a user's chest by a strap arrangement. This is a departure from the present friction type game call which is attached the user's limb, wherein there is an unimpeded dissipation of the call's sound waves.

The present game call has a number of advantages over the above prior art. The unitary game call production costs are lower than the production costs associated with independently producing a game call and a holder. Therefore, the costs to the hunter for a game call that is elevated from the hunter's limb, while being attached thereto, will be less. Additionally, the prior art holder and aperture therethrough are of one design, while the sound emanating surface of the game call placed in the holder maybe an entirely different design. The present invention is manufactured as one piece. Therefore, the acoustics of the present invention are considerably better than the prior art acoustics. The sound emanating surface of the present invention is not hindered or impeded by a misshaped aperture for the specific game call used in the prior art.

Thus, it can be seen that there is a need for a unitary percussive or friction-generated type game call constructed so that the call may be attached to a limb of a user in a spaced apart relationship to the limb. It is to the provision of such a device the present invention is primarily directed.

SUMMARY OF THE INVENTION

The present invention provides a game call that may be releasably secured around a hunter's thigh, wherein a sound emanating surface of the game call is elevated from the hunter's thigh by a platform portion having legs. Generally, the sound emanating surface is the bottom face of the present invention, wherein the sound produced by the present game call can escape to ambient. The present device is of unitary construction, therefore eliminating any loose parts or construction associated with the prior art separate game call and holder. The conventional game call holder typically retains a conventional game call via a retaining means, which requires the user to assemble such a game call with holder.

The present game call preferably comprises a game call portion, a platform portion, legs depending from the platform portion, and a body attachment assembly. The game call portion is generally the sound producing element of the present invention. The game call portion provides the calling sounds not unlike conventional game call, that is, by providing a percussive or friction-generated type game call portion.

In preferred form, the present invention further comprises a platform portion. The platform portion is a planar extension of the lower end of the game call portion. The platform portion provides the present game call with a wider base, the benefit of which is described below. Legs depending from the platform portion provide the spaced-apart relationship between the game call portion of the present device and the limb of the user of the device. When resting upon the hunter's thigh, the legs elevate the game call portion sufficiently from the thigh so that the sound produced by the call portion can exit the game call portion through the sound emanating surface without impedance.

The body attachment assembly enables a user of the device to releasably attach the device to a limb. Using the body attachment assembly, the hunter can move through several positions without the device sliding or falling off the hunter.

Accordingly, an object of the present invention is to provide an improved game call having legs supporting the call in a spaced-apart configuration from a user's limb.

Still another object of the present invention is to provide a one-piece assembly that can be immediately attached without construction to the limb of the hunter.

Yet another object of the present invention is to provide an economical alternative to conventional game calls having separate holder portions, wherein the manufacturing costs of the present invention are less than the manufacturing costs of separately constructed holders and game calls.

Another object of the present invention is to provide a game call device with superior acoustics, in that the entire device is manufactured as a single unit so that the game call portion and the platform portion having legs are both designed to maximize the sound produced by the game call.

These and other objects, features, and advantages of the present invention will become more apparent upon reading the following specification in conjunction with the accompanying drawing figures.

DETAILED DESCRIPTION OF THE PREFERRED EMBODIMENTS

Figure 9:
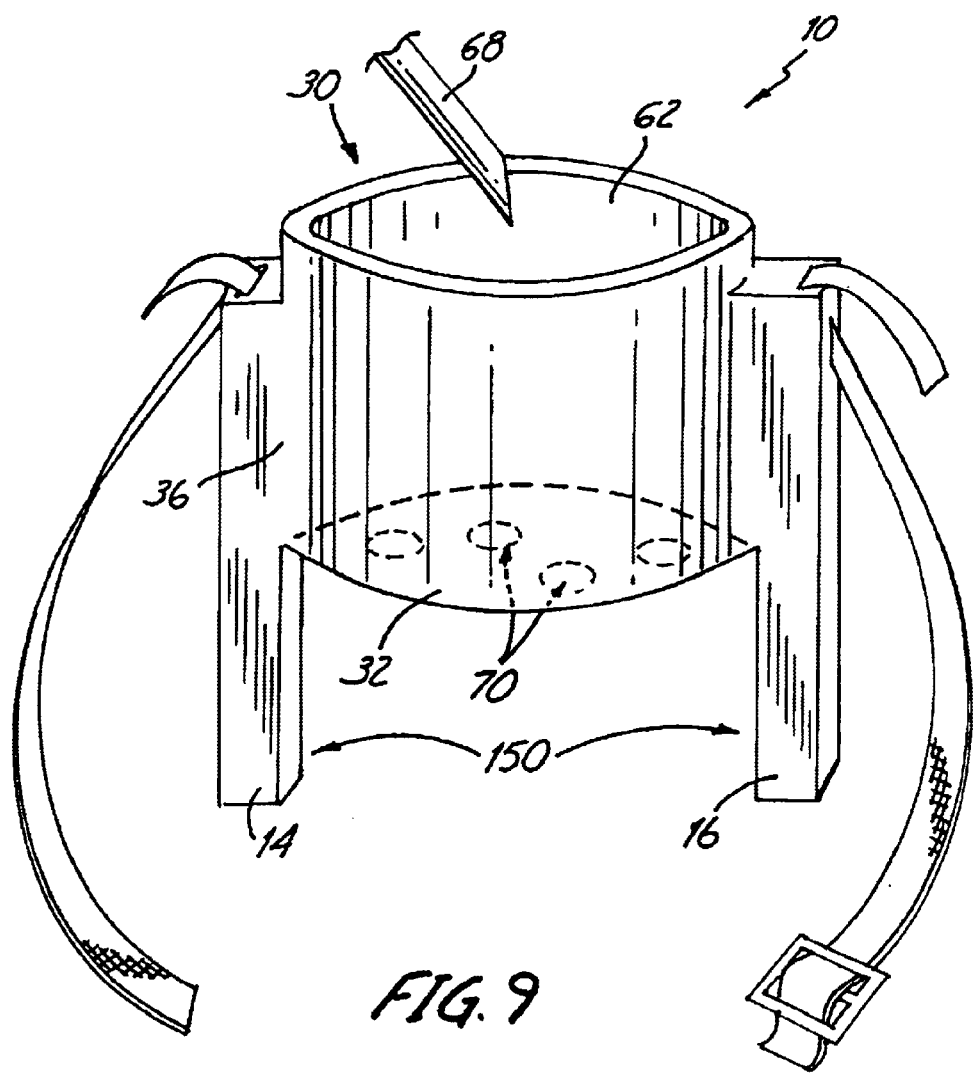
FIG. 9 is a perspective view of a game call according to another embodiment of the present invention.

Referring now in detail to the drawing figures, wherein like reference numerals represent like parts throughout the several views, shown in FIG. 9 is one embodiment of the present invention 10. The call device 10 is of unitary construction and preferably comprises a game call portion 30 wherein the sound is produced, a body attachment assembly 76 that releasably secures device 10 to the body of the user, and an elevating means 150 to distance the game call portion 30 from the body. The device 10 thus presents a one-piece game call 10 that attaches to a limb of the hunter.

Sounds are produced by call 10 upon scratching or rubbing a scratch element 68 back and forth across a surface, for example, a slate surface 62. The resultant sounds are amplified or concentrated within the confines of the call housing 36 and emanate from a plurality of holes 70 formed in a sound emanating surface 32 of housing 36. The slate surface 62, housing 36 and sound emanating surface 32 provide the top face, circular wall, and bottom face, respectfully, of a closed cylindrical game call portion 30. Therefore, it will be evident to one skilled in the art that the sound emanating surface 32 of the conventional game call must rest above a surface while using call 10. That is, the sounds produced by the contact of scratch element 68 and slate surface 62 must escape to ambient through apertures in the call housing to be effective in calling game. Since these apertures are typically holes 70 in the surface 32, these holes 70 must be free and clear of any immediate obstructive surface which would stifle the proper propagation of the sound from the call 10.

The call device 10 of FIG. 9 is one embodiment of the present invention which, unlike the prior art calls, can lie atop a resting surface while in use, without any outside force needed to separate the sound emanating surface 32 of the housing 36 from the resting surface. The game call portion 30 generally comprises scratch surface 62 and call housing 36 having the sound emanating surface 32, wherein surface 32 has a plurality of holes 70. As described above, when a scratch element 68 scratches surface 62, sounds are produced and are amplified or concentrated within the confines of the call housing 36, and emanate from the holes 70 in the surface 32. It will be understood that the shape, material, and general construction of game call portion 30 may vary among configurations, both for producing better sounds for attracting different game, and for easing production costs. Further the holes 70 through which the sounds emanate may vary in size and position on the call 10. While holes 70 are portrayed as cut into the bottom face 32 of call portion 30, holes or apertures may be located elsewhere on portion 30, as long as the surface with holes is not so close to an outside surface that sound emanating from the holes is impeded or muffled by the surface. Therefore, device 10 may comprise a game call portion 30 having a top, slate surface 62, and a bottom, surface 32 without holes, wherein holes 70 are cut into a portion of housing 36. In this embodiment, device 10 may not include an elevating means 150, and bottom 32 may rest upon the hunter's limb.

Also shown in FIG. 9 is body attachment assembly 76 that releasably attaches the game call 10 to a limb of the hunter. While body attachment assembly 76 is fully described in a preferred embodiment of the present invention 10, depicted in FIGS. 1–4, it should be noted that the assembly 76 may be attached to call 10 in numerous ways, and in a variety of locations about device 10. A variety of attachments assemblies exist, and include, for example, Velcro®, elastics, cordage, chain and others. Generally, assembly 76 should comfortably fix call 10 to a limb chosen by the hunter, selected for the hunter's ease of using the present invention. Thus, using device 10 frees one hand of the hunter from holding the call 10, and enables the call 10 to remain in contact with the hunter upon changing stances. Therefore, the hunter can proceed to the shooting mode quickly and quietly.

Figure 10:
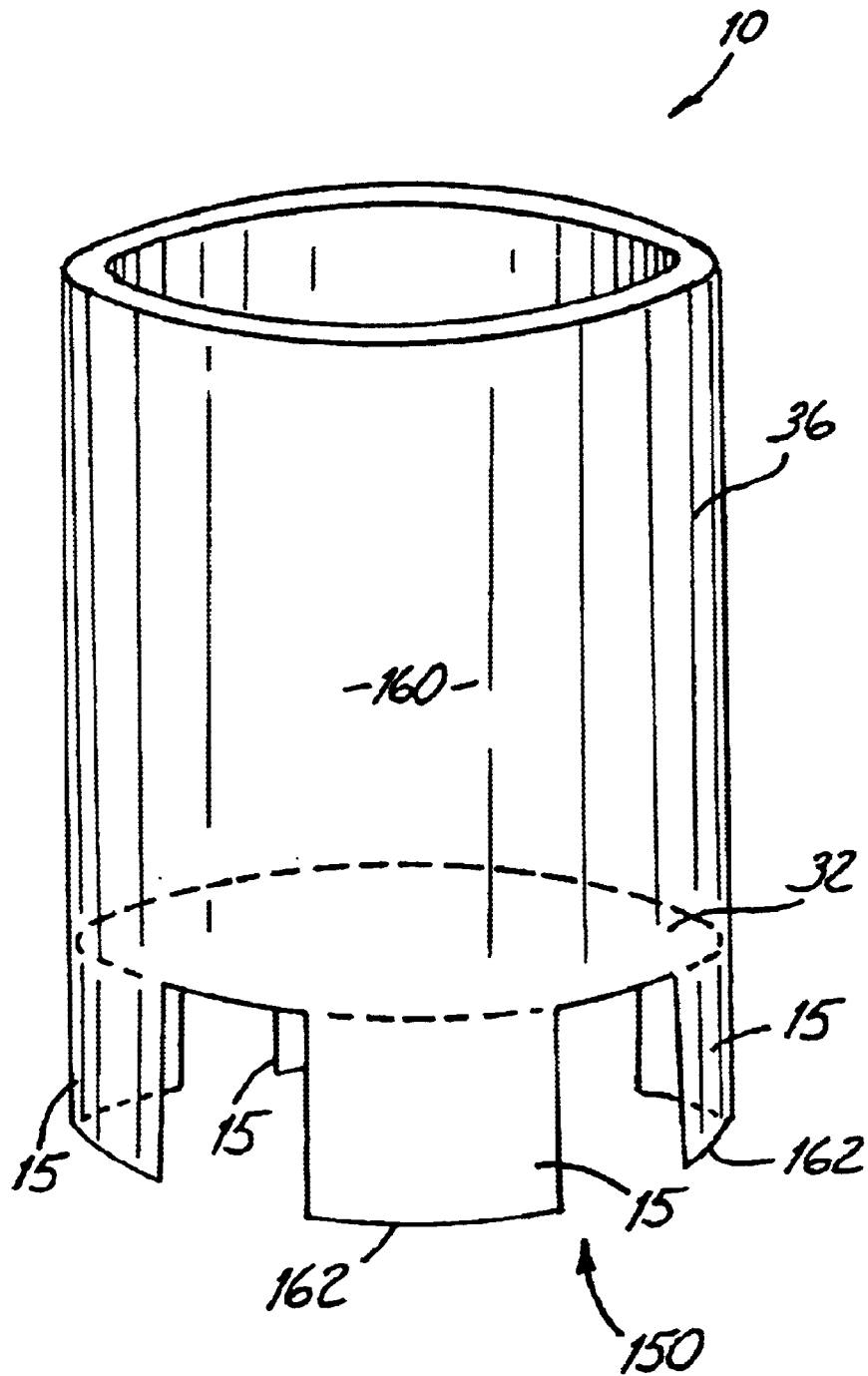
FIG. 10 is a perspective view of a game call according to yet another embodiment of the present invention.

In order to raise the bottom surface 32 away from the surface of the limb of the hunter, call 10 further comprises elevating means 150, shown in FIG. 9 as legs 14, 16. Legs 14, 16 are that portion of call 10 that creates the necessary clearance for hole 70 so that the call 10 works properly. The legs 14, 16 provide the space needed to allow the sound to exit holes 70 and enter ambient unimpeded and unmuffled. The elevating means 150 may take a multitude of embodiments. For example, as shown in FIG. 10, elevating means 150 may comprise extending the outer wall 160 of housing 36 beyond the sound emanating surface 32. In this embodiment, the extension of the wall 160 beyond surface 32 must not be integrally complete around bottom 32 because if all portions of wall 160 were extended, and such extension were in contact with the body limb, the sound would not escape to ambient as there would be no escape of the sound between the bottom edge 162 of extended wall 160 and the surface of the limb. Thus if only portions of wall 160 are extended, the extended portions would look more like curved legs 15 extending from bottom surface 32 around only portions of bottom 32. There must be enough space between such legs 15 that the sound produced would not be impeded to ambient.

Shown in FIG. 9, legs 14, 16 simply extend from the wall 160 of housing 36 above the bottom surface 32. Similarly, other elevating means 150 may be combined with the present invention 10 to raise sound emanating surface 32 sufficiently away from the surface of the hunter's limb, so that the call 10 may accurately produce sound intended to call animals toward the hunter.

Figure 1:
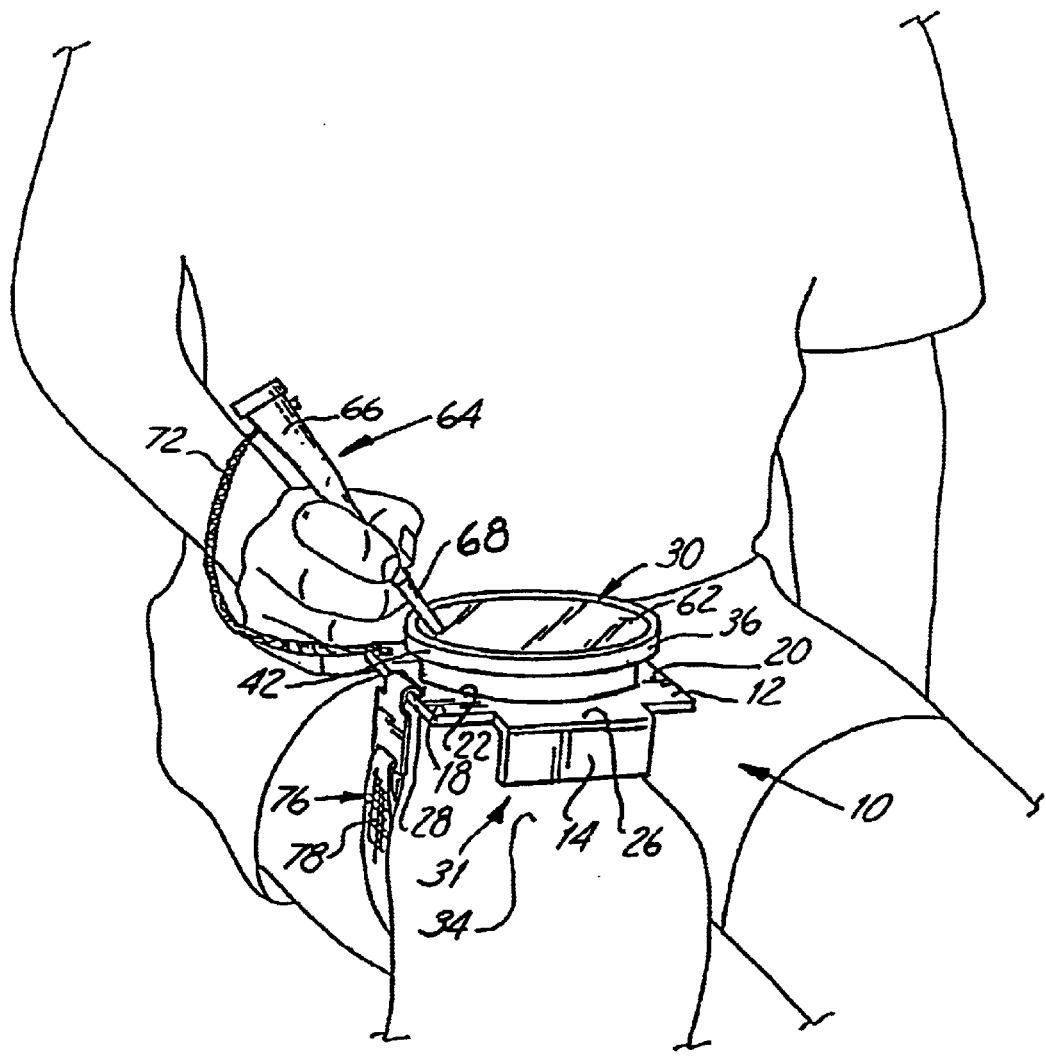
FIG. 1 is a perspective view of a game call according to a preferred embodiment of the present invention.

FIGS. 1–4 depict a preferred embodiment of the present invention 10. The call device 10 of FIG. 1 is of unitary construction and preferably comprises a game call portion 30, a platform portion 31, legs 14, 16 depending from said platform portion 31, and a body attachment assembly 76. As previously described, the game call portion 30 is that element of the call device 10 wherein the sounds are produced. The platform portion 31 provides a platform for both legs 14, 16 and provides a location for the attachment of assembly 76 to device 10. The legs 14, 16 come in contact with the user's limb 34, and define the separation difference between the game call portion 30 and the limb 34. The elevating means 150 of FIGS. 9 and 10 are represented in this preferred embodiment by platform portion 31 and legs 14, 16. Lastly, the body attachment assembly 76 allows the call device 10 to be releasably secured to the user's limb 34.

Figure 2:
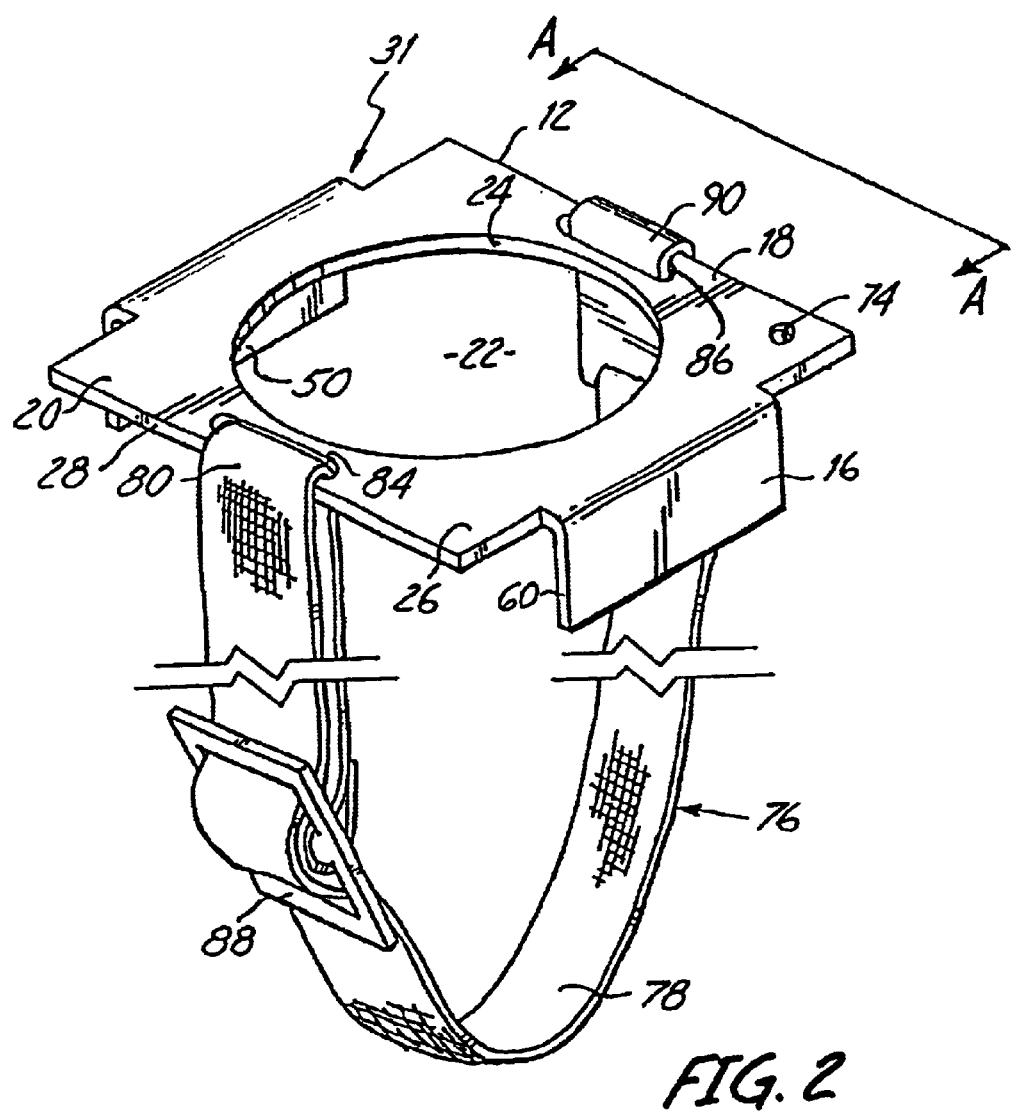
FIG. 2 is an enlarged perspective cross-section of the platform portion of the present invention of FIG. 1.
Figure 3:
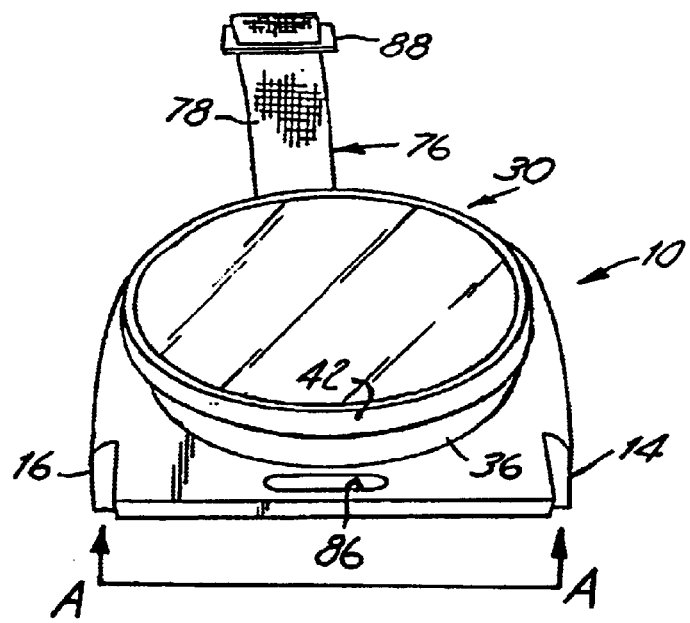
FIG. 3 is a side perspective view of the embodiment of the present invention of FIG. 1.
Figure 4:
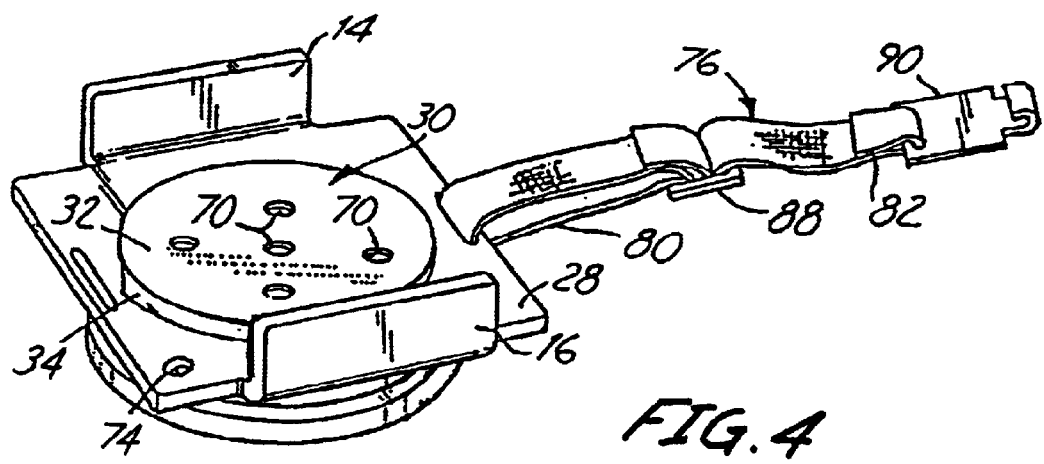
FIG. 4 is a bottom perspective view of the embodiment shown in FIG. 3.

The unitary call device 10 has a game call portion 30 and a platform portion 31. For convenience and clarity of description, as shown in FIGS. 2 and 3, device 10 is presented as comprising two different portions 30, 31, which are generally divided by a parallel plane A—A. FIG. 2 presents only platform portion 31. It should be noted that plane A—A does not strictly define the dividing plane between the entirety of portions 30 and 31. To be precise, below plane A—A and not shown in FIG. 2 is the extension of game call portion 30 below, or through, aperture 22 wherein aperture 22 is the cross-sectional aperture of game call portion 30 extending through platform portion 31. FIG. 4 reveals those elements of call portion 30 that are located below plane A—A, according to this preferred embodiment of the present invention.

As shown in FIGS. 1 and 3, generally above plane A—A, is the game call portion 30 of the present invention 10. Game call portion 30 generally comprises a percussive or friction-generated type game call. As shown in FIGS. 1, 3 and 4, game call portion 30 preferably comprises a cylindrical housing or sound case 36 which may taper or step inwardly towards the sound emanating surface 32 of the game call portion 30. In one embodiment of the present invention, the top of the game call portion 30 of call 10 has an enlarged diameter rim 42.

As will be known to those skilled in the art, as shown in FIG. 1, the game call portion 30 of game call 10 includes an uppermost slate 62 or the like that presents a highly frictional surface when rubbed by a hard, disparate member such as the illustrated striker 64. A typical striker 64 includes a handle 66 provided with a forward scratch element 68. Sounds are produced upon scratching or rubbing the scratch element 68 back and forth across the surface of the slate 62. The resultant sounds are amplified or concentrated within the confines of the call housing 36 and emanate from a plurality of holes 70 formed in the sound emanating surface 32, as shown in FIG. 4. Since this sound emanating surface 32 is disposed in a position elevated sufficiently above the user's thigh 34, the produced sounds are not muffled and pass into the ambient air.

Device 10 further provides an elevated, planar platform portion 31 of call 10 having opposite front and rear legs 14, 16, respectively, depending therefrom. The platform portion 31 which is generally square or rectangular, includes a pair of oppositely disposed side wings 18, 20 defining a lateral extension to the platform portion 31 which is greater than that of the two legs 14, 16, while the center of platform portion 31 is shown with the circular cross-sectional aperture 22 of the game call portion 30. Generally, platform portion 31 of game call 10 provides more comfortable dimensions for attaching game call 10 to the user. The user may more easily balance call 10 with a wide platform portion 31 against, for example, the hunter's thigh. If the elevating means 150 shown in FIG. 9 or 10 were used on a hunter's thigh, depending on the circumference of game call portion 30, the elevating means 150 would not sufficiently stride an appropriate length of the hunter's thigh, leading to an unbalanced attachment.

It will be appreciated that legs 14, 16 may alternatively extend from side wings 18, 20. In this configuration legs 14, 16 would straddle the width of the limb. Therefore, a larger planer surface of platform portion 31 would be used on wider limbs, while a smaller platform portion 31 would be used on, for example, the wrist or arm.

The intent of the raised platform portion 31 of call 10 is to provide a support surface that is disposed in a plane well spaced from a limb of a user when the present device 10 is attached to the user's body as depicted in FIG. 1, so that any construction of game call 10, when affixed thereto, will have its lower, sound emanating surface 32, positioned away from the user's body. One preferred and comfortable stand when turkey hunting is to assume a seated position with one's back resting against a tree. Accordingly, with one leg drawn up, the hunter's thigh 34 will then offer an ideal location for attaching the present call 10 as it will provide the game call 10 attached to the thigh 34, and wherein the device 10 is immediately adjacent the hunter's chest and very close to the trigger of a gun (not shown) poised at the ready. As shown in FIG. 1, in the case of a right handed shooter, the call 10 would be attached to one's right thigh 34, for manipulation by the right hand while the left leg and arm serve to support the firearm.

From the view of FIG. 1, it will be seen that a flexible lanyard or tether 72 may also be provided to keep the striker 64 from becoming separated from the top surface 26 of platform portion 31. Additionally, the tether 72 precludes the striker 64 from hitting the ground when suddenly released, as, for example, when the hunter spies a ready target and reaches for the gun trigger. Preferably, one end of the lanyard 72 may be secured through a hole 74 formed in a corner of the platform portion 31, while the opposite end is secured to the handle 66 of the striker 64. Flexible tether 72 may also attach to a device 10 without a platform portion 31, in any suitable manner.

The game call 10 may be firmly attached to the hunter's limb 34 by manipulating a body attachment assembly 76, shown in FIGS. 1–5. The assembly 76 preferably comprises an elongated flexible element or strap 78 having one closed end 80 attached to the call 10. The opposite free end 82 of strap 78 is adapted to be releasably connected to another portion of the call 10 after passing the elongated element about the user's limb 34. The side wings 18, 20 are of the platform portion 31 of call 10 are provided with a receiving formation comprising an elongated closed slot 84, 86 with the closed loop end 80 of the flexible strap 78 passing through one slot 84. A slidable buckle 88 or the like, intermediate the ends of the strap 78, allows initial adjustment of the overall length of the body attaching assembly 76 pursuant to an individual's limb size, clothing bulk and comfort level, when the assembly 76 is secured. Body attachment 76 is secured through a catch or hook 90 on the free end 82 and which is adapted to engage the other platform portion slot 86, following which the buckle 88 may be finally manipulated to snug the flexible element 78 to suit the user.

Thus in a preferred embodiment, when the hunter has attracted a target to his liking, the striker 64 is released and retained by its tether 72 while the hunter moves his hand to engage the gun trigger, the latter motion being only a few inches in most cases.

Figure 5:
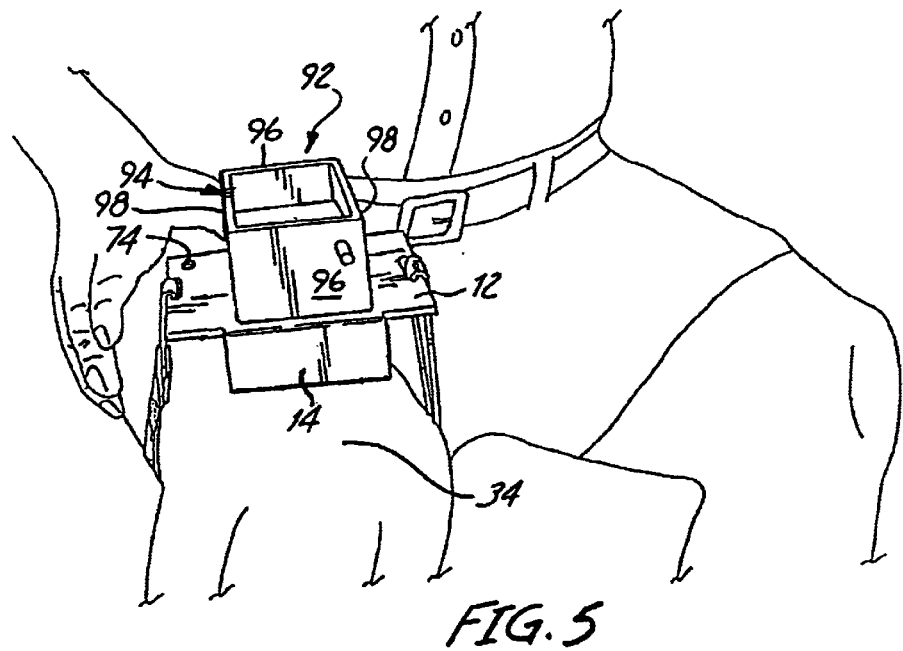
FIG. 5 is a front perspective view of a pin type turkey call embodiment of the present invention.
Figure 6:
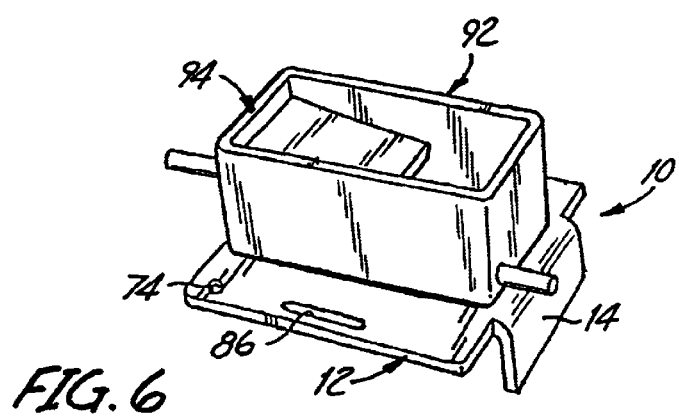
FIG. 6 is a side perspective view of the call shown in FIG. 5.
Figure 7:
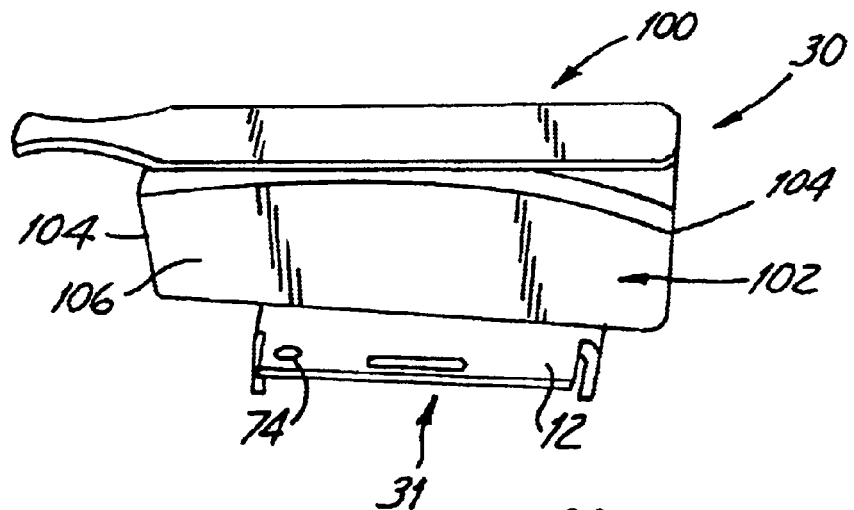
FIG. 7 is a side perspective view of a rocker box type embodiment of the present invention.
Figure 8:
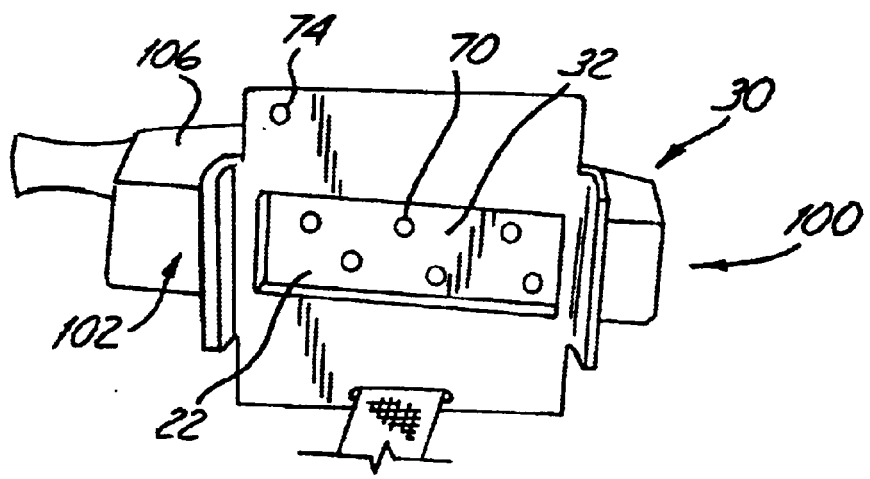
FIG. 8 is a bottom perspective view of the structure of FIG. 7.

FIGS. 5–8 illustrate two further representative embodiments of the present invention comprising game call portions 30 having a rectangular box call. FIGS. 5–6 depict a game call portion 30 having a pin type box call 92 including a rectangular sound box 94 having opposite end walls 96—96 and side walls 98—98. FIGS. 7–8 illustrate a game call portion 30 comprising a rocker type call portion 100. Call portion 100 has a rectangular sound box 102 including opposite end walls 104—104 and side walls 106—106. The embodiments of FIGS. 5–8 comprise rectangular sound emanating surfaces 2. FIGS. 5 and 6 show box call 92 fully encircled with platform portion 31. FIGS. 7 and 8 show another embodiment of portion 31 that extends only from portions of call 100, wherein the bottom face of call 100 does not fully comprise sound emanating surface 32. Further, as shown in FIG. 8, game call portion 30 may not necessarily extend through aperture 22. The area of aperture 22 in FIG. 8 is significantly less than the area of the bottom face of sound box 102, although the width of box 102 may be equal to the width of aperture 22. As shown, boxes 94,102 readily straddle aperture 22 with their end walls 96—96 and 104—104 juxtaposed the platform portion legs 14, 16 respectively.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A hunting device for producing sound comprising:
   (a) a one-piece game call and elevating device, wherein sound is produced, said game call having a scratch surface separated from a sound emanating surface, the sound emanating surface having apertures through which the sound in said game call escapes the game call; and
   (b) a body attachment assembly, connected to said elevating device, designed to releasably attach the game call and elevating device to the body of a user of the hunting device;
   the elevating device elevating the sound emanating surface of said game call such that the sound emanating surface is not in contact with a user when the body attachment assembly is attached to the body of a user, thereby providing an unencumbered path for the sound to escape the game call and reach ambient.

2. A hunting device according to claim 1, wherein said elevating device comprises legs each having a first end and a second end, wherein said first ends of said legs are attached to said game call; and wherein said second ends of said legs are designed to contact the body of a user.

3. A hunting device according to claim 1, wherein said elevating device comprises:
   (a) a platform having a top surface and a bottom surface, said platform supporting said game call; and
   (b) legs depending from said platform, each said leg having a first end and a second end, wherein said first end of each said leg is in contact with said platform; and wherein said second end of each said leg is designed to contact the body of a user.

4. A hunting device according to claim 3, wherein said platform of the hunting device is substantially rectangular and includes front and rear legs extending from said bottom surface of said platform.

5. A hunting device according to claim 1, wherein said body attachment assembly comprises:
   (a) an elongated flexible element having one end connected to said elevating device; and
   (b) an opposite free end on said flexible element provided with a hook.

6. A hunting device according to claim 5, further comprising a receiving formation on said platform and wherein said hook is selectively engagable and disengagable with the receiving formation.

7. A hunting device according to claim 6, wherein said elongated flexible element comprises:
   (a) a strap; and
   (b) a buckle on said strap allowing for the adjustment of the length of said strap.

8. A hunting device according to claim 5, further comprising:
   (a) a flexible tether having opposing ends; and
   (b) a striker;
   wherein said opposing ends of said tether are respectively attached to said striker and said platform of the device.

9. A hunting device for a hunter, the hunting device for producing sounds
   (a) a one-piece game call with legs, the game call having a scratch surface and a sound emanating surface, the sound emanating surface having apertures through which sound in the game call can escape the game call, each leg extending from the sound emanating surface and terminating in a leg end; and
   (b) a body attachment assembly designed to releasably secure each leg end to a hunter;

the sound emanating surface designed to be separated a distance from a hunter by the legs when said body attachment assembly is secured to a hunter, each leg end designed for supporting the hunting device on a hunter, and for providing an unencumbered path for the sounds to escape the game call.

10. The hunting device according to claim 9, further comprising:
   (a) a flexible tether having opposing ends; and
   (b) a striker;
   wherein said opposing ends of the tether are respectively attached to the striker and the game call.

11. The hunting device according to claim 9, wherein the body attachment assembly comprises:
   (a) an elongated flexible element having one end connected to the game call;
   (b) an opposite free end on the flexible element provided with a hook; and
   (c) a receiving formation on the game call, wherein the hook is selectively engagable and disengagable relative the receiving formation.

12. The hunting device according to claim 11, wherein the elongated flexible element comprises:
   (a) a strap; and
   (b) a buckle on said strap allowing for the adjustment of the length of said strap.

13. A hunting device for producing sound comprising:
   (a) a one-piece game call and elevating device, wherein sound is produced, said game call having a scratch surface separated from a sound emanating surface, the sound emanating surface having apertures through which the sound in said game call escapes the game call; and
   (b) a body attachment assembly connected to said elevating device, designed to releasably attach the game call and elevating device to the body of a user of the hunting device;
   said body attachment assembly comprising (i) an elongated flexible element having one end connected to said elevating device; and (ii) an opposite free end on said flexible element provided with a hook;
   the elevating device elevating the sound emanating surface of said game call such that the sound emanating surface is not in contact with a user when the body attachment assembly is attached to the body of a user, thereby providing an unencumbered path for the sound to escape the game call and reach ambient.

14. A hunting device according to claim 13, wherein said elongated flexible element comprises:
   (a) a strap; and
   (b) a buckle on said strap allowing for the adjustment of the length of said strap.

15. A hunting device according to claim 13, further comprising:
   (a) a flexible tether having opposing ends; and
   (b) a striker;
   wherein said opposing ends of said tether are respectively attached to said striker and said platform of the device.

16. A hunting device for a hunter, the hunting device for producing sounds and comprising:
   (a) a one-piece game call with legs, the game call having a scratch surface and a sound emanating surface, the sound emanating surface having apertures through which sound in the game call can escape the game call, each leg extending from the sound emanating surface and terminating in a leg end; and
   (b) a body attachment assembly designed to releasably secure each leg end to a hunter comprising (i) an elongated flexible element having one end connected to the game call; (ii) an opposite free end on the flexible element provided with a hook; and (iii) a receiving formation on the game call, wherein the hook is selectively engagable and disengagable relative the receiving formation;
   the sound emanating surface designed to be separated a distance from a hunter by the legs when said body attachment assembly is secured to a hunter, each leg end designed for supporting the hunting device on a hunter, and for providing an unencumbered path for the sounds to escape the game call.

17. The hunting device according to claim 16, wherein the elongated flexible element comprises:
   (a) a strap; and
   (b) a buckle on said strap allowing for the adjustment of the length of said strap.

* * * * *

EX PARTE REEXAMINATION CERTIFICATE (7997th)

United States Patent
Musacchia, Jr.

(10) Number: US 6,780,079 C1
(45) Certificate Issued: Jan. 18, 2011

(54) ELEVATED GAME CALL WITH ATTACHMENT FEATURE

(75) Inventor: John Musacchia, Jr., Cartersville, GA (US)

(73) Assignee: Muzzy Products Corporation, Cartersville, GA (US)

Reexamination Request:
No. 90/008,081, Oct. 16, 2006

Reexamination Certificate for:
Patent No.: 6,780,079
Issued: Aug. 24, 2004
Appl. No.: 09/174,868
Filed: Oct. 19, 1998

(51) Int. Cl.
*A01M 31/00* (2006.01)
*A63H 5/00* (2006.01)

(52) U.S. Cl. .................. 446/397; 224/222; 224/267; 224/910; 446/26; 446/404; 446/418

(58) Field of Classification Search .............. 224/101, 224/191, 218, 219, 222, 224, 225, 250, 251, 224/267, 277, 910; 108/43; 446/26, 28, 397, 446/404, 418; 84/411 R, 420, 421, 102, 402, 84/327–329, 280, 453
See application file for complete search history.

(56) References Cited

U.S. PATENT DOCUMENTS

| 4,387,531 A | 6/1983 | Jacob |
| 4,586,912 A | 5/1986 | Adams |
| 5,607,091 A | 3/1997 | Musacchia, Sr. |
| 5,988,469 A | 11/1999 | Musacchia, Sr. |

*Primary Examiner*—Sara S Clarke

(57) ABSTRACT

A unitary game call having a platform with legs, that can be affixed to a limb of a hunter. When retained, the game call's bottom face, or sound emanating surface, is maintained in a position elevated from the hunter's limb by the legs depending from the platform. Further, an adjustable, flexible body attaching member serves to secure the retained game call relative the limb.

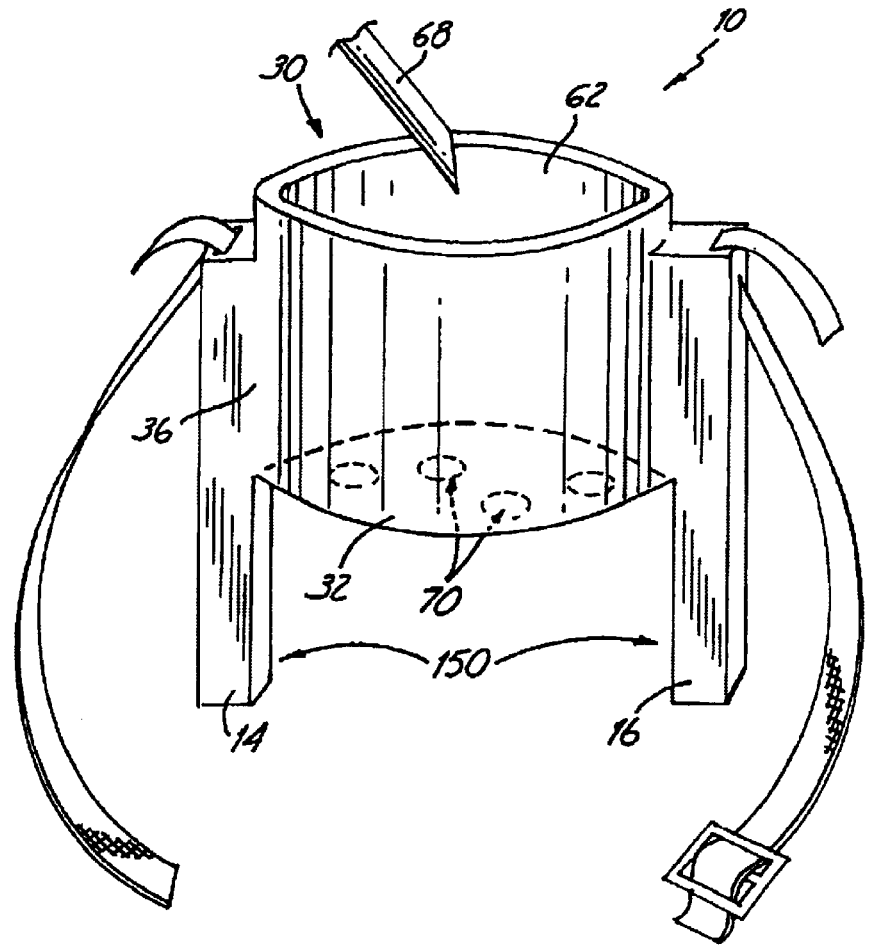

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *